United States Patent

[11] 3,613,977

| [72] | Inventor | John F. Egan |
| | | Rochester, N.Y. |
| [21] | Appl. No. | 35,802 |
| [22] | Filed | May 8, 1970 |
| [45] | Patented | Oct. 19, 1971 |
| [73] | Assignee | Eastman Kodak Company |
| | | Rochester, N.Y. |

[54] MEANS FOR SECURING AND RELEASING STRIP END PORTIONS
20 Claims, 11 Drawing Figs.

[52] U.S. Cl. ..................................................... 226/91, 242/195
[51] Int. Cl. ..................................................... G11b 15/66
[50] Field of Search ........................................... 226/91, 92, 52, 62; 242/195; 352/158

[56] References Cited
UNITED STATES PATENTS

| 1,685,010 | 9/1928 | Thornton ..................... | 242/71.1 |
| 3,119,574 | 1/1964 | Laa ............................ | 242/195 |
| 3,195,825 | 7/1965 | Louzil ......................... | 242/195 |
| 3,414,269 | 12/1968 | Appel .......................... | 242/195 X |
| 3,458,156 | 7/1969 | Davies et al. ................ | 242/195 X |

Primary Examiner—Allen N. Knowles
Attorneys—John D. Husser and Robert W. Hampton ABSTRACT: In a strip transport apparatus which is adapted for use with a cartridge of the type having a strip retaining member comprising a finger and barb that releasably engage one edge of an aperture in the leading end portion of a strip of web material wound on a reel in the cartridge interior, first and second members are actuatable to sequentially release such an engaged strip portion respectively from the barb and finger. In operation, the first member frees the engaged strip portion from the barb, and the second member feeds such partially free strip portion out of the cartridge interior while simultaneously drawing it off the finger. Thereafter, the released strip is fed into the interior of an empty cartridge of the same type, and one edge of an aperture in the trailing end portion of such feeding strip is sequentially engaged by the latter cartridge's finger and barb upon actuation of a strip guiding member of the apparatus.

JOHN F. EGAN
INVENTOR.

ATTORNEYS

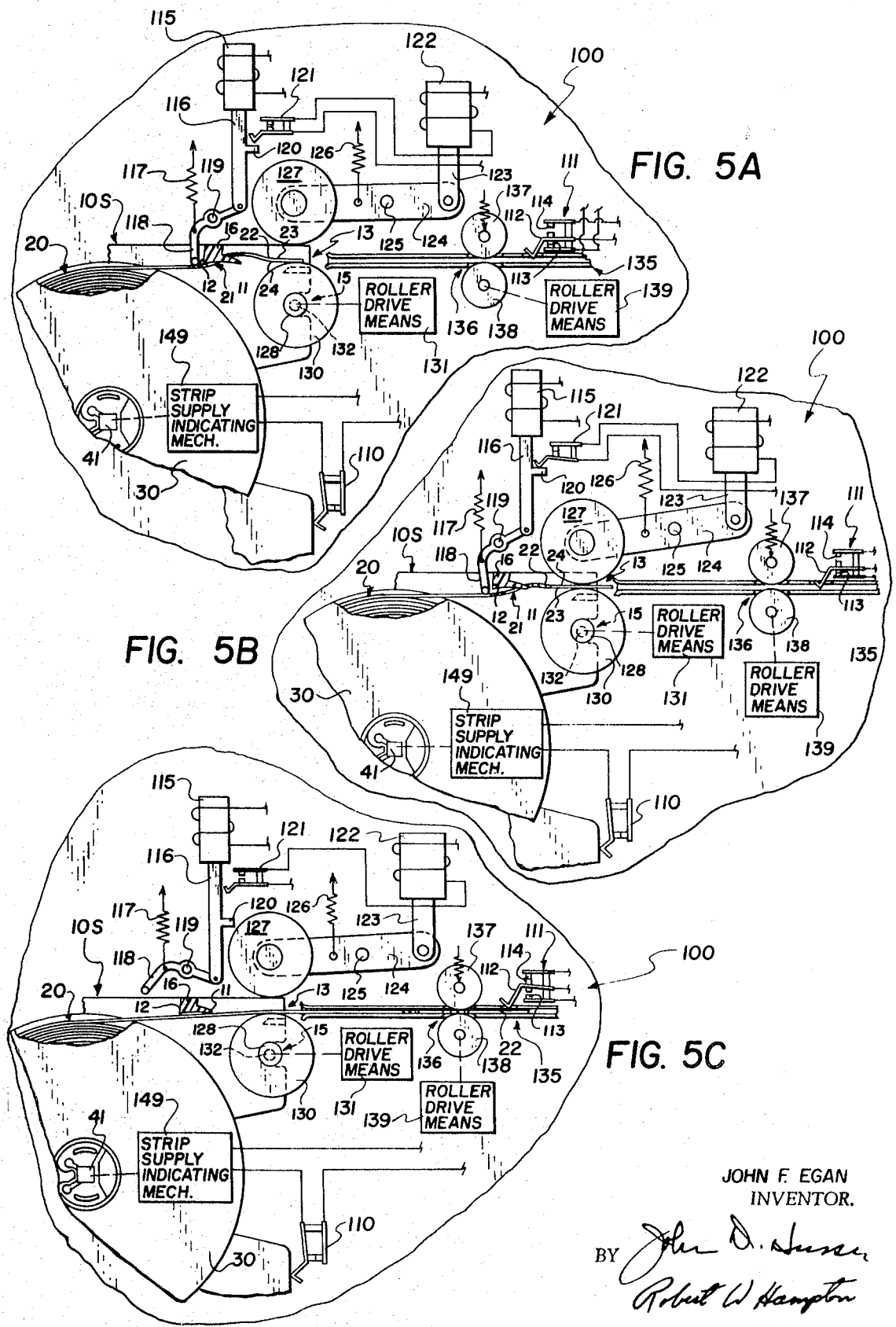

MEANS FOR SECURING AND RELEASING STRIP END PORTIONS

CROSS-REFERENCE TO RELATED APPLICATION

Reference is made to commonly assigned copending U.S. Pat. application Ser. No 35,803, entitled "Improved Magazine for a Reel of Film or the Like," filed in the name of John F. Egan on May 8, 1970.

BACKGROUND OF THE INVENTION

1. Field of the Invention

The present invention relates to strip handling, and more particularly to novel and improved means for securing and releasing a leading one of opposite end portions of a strip of web material with respect to a strip retaining member of a strip storing cartridge.

2. Description of the Prior Art

Sensitized material presently used for the recording and playback of audio and/or visual information frequently takes the form of a weblike strip. Characteristically, such strip material is of a plasticlike substance, as for example "Mylar," which has a strong tendency to curl. Thus, when a strip of the sensitized plasticlike material is wound on a reel and stored in the interior of a cartridge, as is the common commercial practice, the material's curling propensity may induce the leading, i.e. free, end portion of the reeled strip to shift out of alignment with a strip egress opening in the cartridge wall. Moreover, once the leading end portion of the reeled strip is misaligned with respect to the strip egress opening, feeding of the strip material out of the cartridge interior often cannot be accomplished, and the strip which is attempted to be so fed may become snarled within the cartridge interior.

To obviate such a misalignment problem, cartridges for storing a reeled strip of web material have been devised wherein means are provided for releasably securing the leading end portion of the reeled strip adjacent the cartridge's strip egress opening. As an example of such strip securing means, it has previously been suggested to mount an arresting spring on the interior wall of the cartridge for the purpose of engaging at least one edge of an aperture in the leading end portion of the reeled strip. To release such an engaged strip for feeding of its leading end portion out of the cartridge interior, it is necessary to move the arresting spring from its strip engaging position to a nonengaging position. However, the continual flexing of the arresting spring between its engaging and nonengaging positions gradually weakens the spring's effectiveness, and the introduction of a foreign spring member distinct from the composition of the cartridge molding significantly increases material and assembly costs. Furthermore, in order to utilize a cartridge of the type having such an arresting spring in its interior, a mechanism must be built into the apparatus making use of strip material reeled in the cartridge interior to release the arresting spring from the engaged strip end portion and to hold the cartridge in such apparatus against the expelling or otherwise disturbing force of the spring.

One cartridge that appears to overcome the shortcomings of the prior art is disclosed, for example, in commonly assigned copending U.S. Pat. application Ser. No. 35,803, entitled "Improved Magazine for a Reel of Film or the Like," filed in the name of John F. Egan on May 8, 1970. Such a cartridge of this type has an integral strip retaining member that comprises a finger and barb for respectively engaging one edge of an aperture in the leading end portion of a strip of web material wound on a reel in the cartridge interior. The leading end portion of the reeled strip, when engaged by both the finger and barb, is disposed inwardly adjacent an egress-ingress opening in the cartridge through which the strip can pass. In order to draw the engaged end portion off the cartridge finger, it is simply necessary to feed such portion of the reeled strip through the strip egress-ingress opening after the strip portion has been disengaged from the cartridge barb. For such strip feeding purpose, the cartridge is provided with openings of sufficient size to allow strip feeding means to enter the cartridge interior and drivingly engage opposite faces of a portion of the strip disposed between the strip egress-ingress opening and the cartridge finger.

Strip storing cartridges prior to the kind disclosed in the aforementioned Egan application frequently required that the leading end portion of a reeled strip be released from engagement with strip securing means, such as the previously described arresting spring, before such a strip could be fed out of the cartridge interior through the cartridge's strip egress opening. Consequently, the released strip could still shift out of alignment with the strip egress opening. Moreover, in strip transport apparatus utilizing those above-described cartridges known prior to the type of cartridge disclosed in the Egan application, it is necessary for the apparatus to have separate and distinct mechanisms for releasing the leading end portion of a reeled strip from engagement with the strip securing means and for feeding such a released strip out of the cartridge interior. Also, the apparatus must include a mechanism for removing the strip securing means between its strip engaging and nonengaging positions and for holding such means in the latter position. These mechanisms significantly add to the apparatus complexity and cost.

SUMMARY OF THE INVENTION

Accordingly, it is an object of the present invention to provide novel and improved means for securing and releasing a strip of web material.

Another object of the present invention is to provide single means for releasing a secured end portion of a strip of web material and for feeding such strip in a predetermined direction.

Still another object of the present invention is to provide single means for releasing a secured end portion of a strip of web material and feeding such a strip in a predetermined direction, wherein the secured end portion is released in response to such strip feeding.

Yet another object of the present invention is to provide single means for simultaneously releasing a secured end portion of a strip of web material stored in a cartridge and for feeding such strip through a strip egress opening in the cartridge.

And yet another object of the present invention is to provide means, adapted to be used with a cartridge of the type having a strip retaining member that comprises a finger and barb for engaging at least one edge of an aperture in an end portion of a strip of web material stored in the cartridge interior, for sequentially guiding such a strip into engagement with the cartridge finger and barb, and for sequentially releasing such an engaged strip from the cartridge barb and finger.

In accordance with one embodiment of the present invention, there is provided a strip transport apparatus for use with supply and takeup cartridges of the type disclosed in the above-mentioned commonly assigned copending Egan application. Each supply and takeup cartridge has a strip retaining member that comprises a finger and barb which are jointly extendable through an aperture in a free end portion of a strip of web material so as to respectively engage an aperture edge. Such an engaged strip is wound on a reel which is rotatably supported in the interior of a respective cartridge. Moreover, although both end portions of the reeled strip have an aperture formed therein only the free end portion of such strip is engaged by a respective cartridge's finger and barb.

The strip transport apparatus as described in one embodiment of the present invention includes first and second members, actuatable to release a strip which is wound on a reel in a supply cartridge's interior and has its leading end portion engaged both by the finger and barb of such cartridge, and strip guiding member actuatable to direct the trailing end portion of a strip, feeding into an empty takeup cartridge's interior, onto the latter cartridge's finger and barb. In operation, the first and second members are actuated in response to insertion of the supply cartridge into an appropriate receiving area of the strip transport apparatus; the first member being actuated to free the engaged strip portion from the supply cartridge barb, and the second member being actuated to feed such partially free strip portion out of the supply cartridge interior while simultaneously drawing the partially free strip portion off the supply cartridge finger. Thereafter, the released strip is fed into the empty takeup cartridge interior and an edge of the aperture in the trailing end portion of such feeding strip is sequentially engaged by the takeup cartridge's finger and barb in response to actuation of the strip guiding member.

BRIEF DESCRIPTION OF THE DRAWINGS

The above-mentioned and other features and objects of the present invention and the manner of attaining them will become more apparent by reference to the following detailed description of a preferred embodiment of the present invention taken in conjunction with the accompanying drawings, wherein:

FIGS. 5A–5C are plan views of the means for releasing a strip end portion from the strip retaining member, showing a sequence of the operation of such means.

DESCRIPTION OF THE PREFERRED EMBODIMENT

Figure 3:
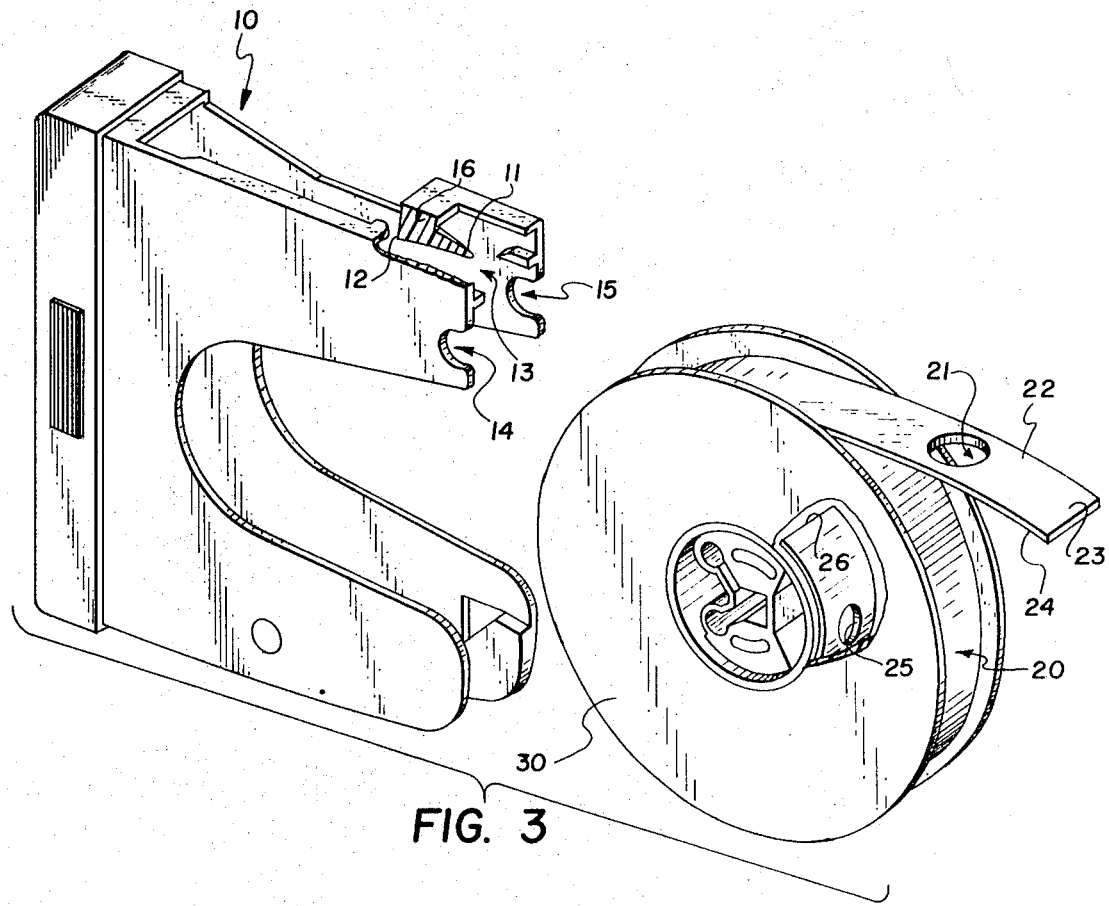
FIG. 3 is an exploded, enlarged perspective view of a supply or takeup cartridge and a reeled strip of web material.
Figure 4:
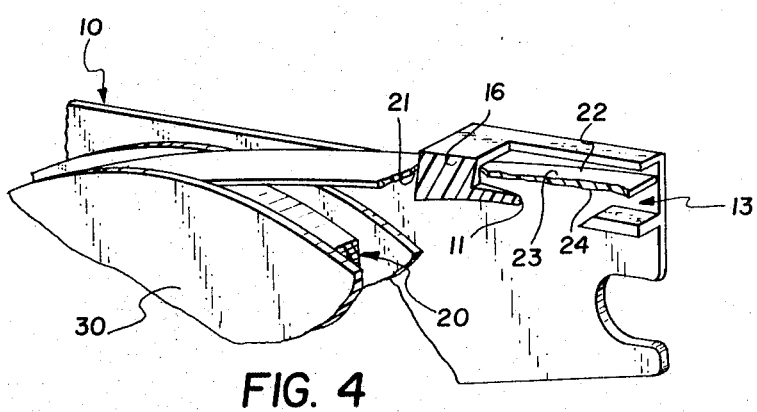
FIG. 4 is an enlarged perspective view of the strip retaining member of the cartridge of FIG. 3, showing the manner in which the finger and barb extend through an aperture in the leading end portion of the reeled strip so as to respectively engage an aperture edge.

Before proceeding with a description of the strip transport apparatus per se, it may be well to first describe the form of the cartridge with which the apparatus is intended to be used. Such a cartridge is shown in FIGS. 3 and 4 and is more fully disclosed in commonly assigned copending U.S. Pat. application Ser. No. 35,803, entitled "Improved Magazine for a Reel of Film or the Like," filed in the name of John F. Egan on May 8, 1970. Cartridge 10 has an integrally formed strip retaining member 16 that comprises a finger 11 and a barb 12. As can be seen in FIG. 4, the finger and barb are jointly extendable through an aperture 21 in end portion 22 of a strip of web material 20 so as to respectively engage an aperture edge; the strip being wound on a reel 30 which is rotatably supported in the cartridge interior. The engaged strip end portion is disposed inwardly adjacent the cartridge's strip egress-ingress opening 13. In order to draw the engaged strip end portion off the cartridge finger, it is simply necessary to feed such portion of the reeled strip through the strip egress-ingress opening after the engaged edge of the aperture 21 has been freed from the cartridge barb, by means described in detail hereinafter. For such strip feeding purpose, the cartridge is provided with an open area of sufficient size to allow strip feeding means, as described more fully below, to enter the cartridge interior and drivingly engage that portion of the opposite strip faces 23 and 24 which is disposed between the cartridge finger 11 and the strip egress-ingress opening 13, see FIG. 4. As will become apparent hereinafter, the engaged strip end portion is automatically drawn off the cartridge finger in response to the feeding of such strip portion through the strip egress-ingress opening in a direction extending out of the cartridge interior.

The strip of web material 20, in addition to having the aperture 21 located in its end portion 22, has another aperture 25 located in its opposite end portion 26, see FIG. 3. For reasons apparent hereinafter, it should be understood that the cartridge finger 11 and barb 12 are only intended to engage an edge of that aperture which is located in the free end portion of a strip reeled in the cartridge interior, which as shown in FIG. 4 is an edge of the aperture 21 located in the free end portion 22 of the reeled strip 20. Furthermore, it can be appreciated that the cartridge barb engages an edge of the aperture 21 in order to positively, i.e. affirmatively, prevent the strip end portion 22 from slipping out of engagement with the cartridge finger when the reeled strip is stored within the cartridge 10.

Figure 2:
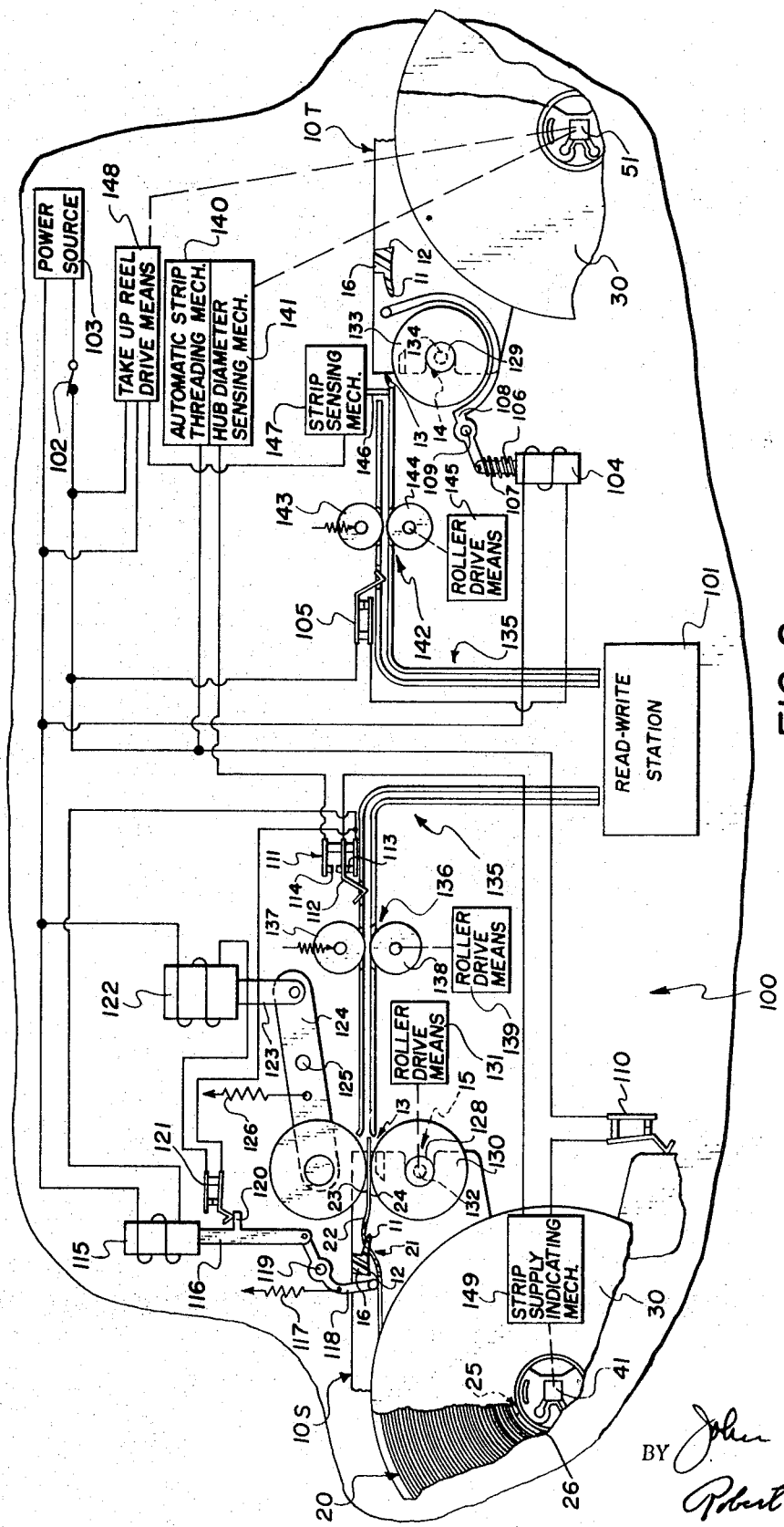
FIG. 2 is a plan view as in FIG. 1, showing initial positions of the releasing and securing means after insertion of supply and takeup cartridges into the strip transport apparatus.

Referring now to FIG. 2, there is shown a strip transport apparatus 100 which is constructed to separately receive a strip material supply cartridge 10S and a strip material takeup cartridge 10T. Both the supply and takeup cartridges are of the same type as the cartridge 10, described above and shown in FIGS. 3 and 4, so that their component parts are referenced by the same numerals as those referencing the latter cartridge. However, where the supply cartridge is intended to initially store the reeled strip 20 in the manner shown by FIG. 2, the takeup cartridge is intended to be initially empty. As is more completely described below, the reeled strip is fed out of the supply cartridge, through a read-write station 101, and thence into the takeup cartridge, Consequently, for simplicity of description, the free end portion 22 of the reeled strip shown in FIG. 2 will hereinafter be referred to as the leading end portion, and the opposite end portion 26 of such strip will hereinafter be referred to as the trailing end portion.

Figure 1:
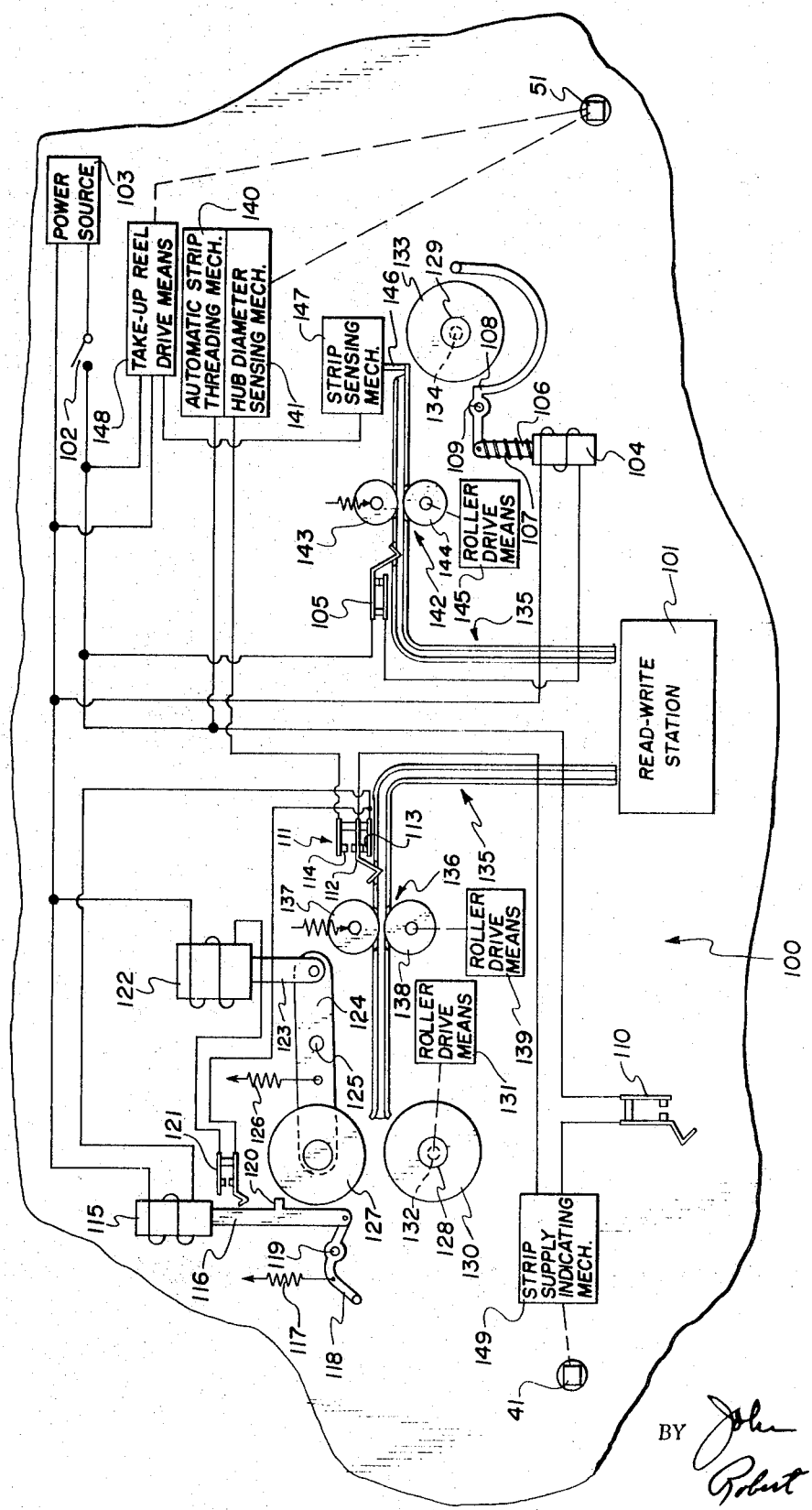
FIG. 1 is a plan view of a strip transport apparatus in accordance with a preferred embodiment of the present invention, showing the means for respectively releasing and securing opposite end portions of a strip of web material.

In order to best understand the present invention, a typical sequence of operation will be described in detail. With reference to FIGS. 1 and 2, it can be seen that a switch 105, located in the schematically illustrated circuit, is normally, i.e. inherently, biased to a closed position. Consequently, the closure of switch 102, place in the illustrated circuit adjacent a power source 103, will connect such source to a solenoid 104 and thereby actuate the latter. Upon such actuation of the solenoid 104, the solenoid armature 106 will be retracted against the urging of helical compression spring 107 so as to pivot a curved strip guiding member 108 in a counterclockwise direction about pivot pin 109 from the member's inactive position shown in FIG. 1 to its active position shown in FIG. 2. It is significant, as will become apparent hereinafter, that the curved strip guiding member 108 when pivoted to its active position has its free end, i.e. the end of the curved member which is not shown as linked to the solenoid armature 106, located in the interior of the takeup cartridge 10T.

Insertion of the supply cartridge 10S into the strip transport apparatus 100 as shown by FIG. 2 closes a switch 110, located in the schematically illustrated circuit and normally, i.e. inherently, biased to an open position as in FIG. 1. Double pole switch 111, also located in the illustrated circuit, is normally, i.e. inherently, biased to a lower position wherein its switching element 112 contacts switch pole 113 and is spaced from switch pole 114. Consequently, should the supply cartridge be inserted in the strip transport apparatus as shown by FIG. 2, then assuming the switch 102 has been closed, the power source 103 will connect with and thereby actuate solenoid 115. Upon such actuation of the solenoid 115, its armature 116 will be retracted against the urging of helical tension spring 117, so as to pivot a member 118 in a counterclockwise direction about pivot pin 119 from the member's inactive position shown in FIG. 1 to an active position shown in FIG. 2. It is significant, as will become apparent hereinafter, that the member 118 when pivoted to its active position has its free end, i.e. the end of the member which is not shown as linked to the solenoid armature 116, located in the supply cartridge interior.

Referring now in particular to FIGS. 5A and 5B, it can be seen that when the solenoid 115 is actuated in response to insertion of the supply cartridge 10S into the strip transport apparatus 100 and consequently the member 118 is pivoted to its active position partially within the supply cartridge interior, a finger 120 located on the solenoid armature 116 will close a normally open switch 121 located in the schematically illustrated circuit. Closure of the switch 121 in this instance connects the power source 103 with such switch and thereby actuates a solenoid 122. Upon such actuation of the solenoid 122 its armature 123 will be retracted so as to pivot arm 124 abut pivot pin 125 in a counterclockwise direction against the urging of helical tension spring 126. As idler, i.e. pinch, roller 127 is rotatably mounted on the free end of the arm 124, i.e. the end of the arm which is not shown as linked to the solenoid armature 123, such roller will upon actuation of the solenoid 122 be moved from an inactive position shown in FIGS. 1, 5A and 5C to a strip feeding position shown in FIGS. 2 and 5B. It is significant, as will become apparent hereinafter, that a portion of the edge of the idler roller, when moved to its strip feeding position, will be located in the supply cartridge interior between the supply cartridge's finger 11 and strip egress opening 13.

Bearings 128 and 129 are fixed to the strip transport apparatus 100 within areas thereof which are constructed for respectively receiving the supply and takeup cartridges 10S and 10T. As shown in FIG. 2, a roller 130 is connected to suitable roller drive means 131 and is rotatably supported by a journal 132 located within the bearing 128, and a roller 133 is rotatably supported by journal 134 located within the bearing 129. Each cartridge as seen in FIG. 3 has a pair of parallel spaced notches 14 and 15 formed therein for the receipt of either of the bearings. Thus, upon insertion of the supply and takeup cartridges into the respective cartridge receiving areas of the strip transport apparatus, the bearings will each cooperate with a pair of the cartridge notches so as to orient the inserted supply and takeup cartridges in the manner shown by FIG. 2. Moreover, it is to be noted that cartridge support spindles 41 and 51, respectively located in the supply and takeup cartridge receiving areas of the strip transport apparatus, can be retractable so as to facilitate insertion and withdrawal of a particular cartridge.

Referring again to FIG. 5A, it can be seen that when the member 118 is pivoted to its active position, in response to insertion of the supply cartridge 10S into the strip transport apparatus 100, the member's free end will contact the leading end portion 22 of the reeled strip 20, inwardly of the strip aperture 21, and automatically disengage the strip portion from the cartridge barb 12 while leaving such strip portion engaged by the cartridge finger 11. Thereafter, as shown in FIG. 5B, when the idler roller 127 is moved to its strip feeding position in response to closure of the switch 121 as described above, a section of the strip's leading end portion which is disposed interjacent the supply cartridge's finger 11 and strip egress opening 13 will be sandwiched between the idler roller 127 and the drive roller 130, i.e. the opposite faces 23 and 24 of such strip section are respectively pressed into intimate frictional contact with the idler and drive rollers. It now becomes apparent that if the drive roller is rotated in a clockwise direction by the roller drive means 131 when the strip section is sandwiched between the idler and drive rollers, then the strip's leading end portion 22 will be fed out of the supply cartridge interior through the strip egress opening 13, while such strip portion is simultaneously drawn off the supply cartridge finger and the strip 20 is unwound from the supply cartridge reel 30.

As shown in FIG. 5B, the strip of web material 20 feeding out of the supply cartridge 10S will enter a strip guideway 135 wherein feeding of such strip is enforced by a strip feeding means 136, such as the schematically shown spring urged idler roller 137 and the roller 138 which is driven by suitable roller drive means 139, see FIG. 5C. After the leading end portion 22 of the feeding strip has advanced in the strip guideway beyond the strip feeding means 136, such strip portion will meet the switching element 112 of the double pole switch 111, and thereupon move the latter element from its normal lower position as shown in FIG. 5B to an upper position as shown in FIG. 5C, wherein the element contacts the switch pole 114 and is spaced from the switch pole 113. Consequently, the respective connections in the schematically illustrated circuit between the power source 103 and the solenoids 115 and 122 will be interrupted so that the spring 117 can retract the member 118 to its inactive position and the spring 126 can retract the idler roller 127 to its inactive position, as shown by FIG. 5C. Retraction of the member 118 to its inactive position allows the switch 121 to return to its normally open position because the finger 120 of the solenoid armature 116 no longer contacts that switch in the manner shown by FIG. 5B. Moreover, when the switching element is moved from its lower to its upper position, the power source 103 will be connected in the schematically illustrated circuit to an automatic strip threading mechanism 140 and a takeup hub diameter sensor 141, the significance of which will become apparent hereinafter.

Figure 6A:
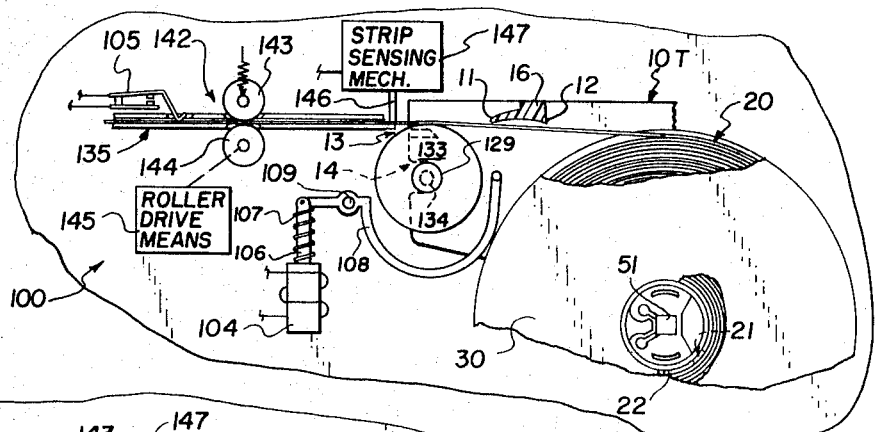
FIGS. 6A–6D are plan views of the means for securing a strip end portion to the strip retaining member, showing a sequence of the operation of such means.

Referring again to FIG. 2, it can be seen that the strip guideway 135 is constructed to direct a strip of web material 20 feeding, i.e. moving, therethrough from the double pole switch 111 to the read-write station 101, and thence to the normally closed switch 105. Movement of the leading end portion 22 of such a feeding strip past the normally closed switch 105 opens the latter so as to interrupt the connection in the schematically illustrated circuit between the power source 103 and the solenoid 104. Consequently, the spring 107 will pivot the curved strip guiding member 108 in a clockwise direction from the member's active position shown in FIG. 2 to its inactive position shown in FIGS. 1 and 6A. Feeding of the strip material is then enforced past the now open switch 105 by a strip feeding means 142, such as the schematically shown spring urged idler roller 143 and the roller 144 which is driven by suitable roller drive means 145. Thereafter, the leading end portion of the feeding strip moves out of the strip guideway and onto the hub of the reel 30 in the takeup cartridge 10T. Concurrently, the probe 146 of a strip sensing mechanism 147, located in the schematically illustrated circuit, is depressed by such moving strip, thereby actuating a takeup reel drive means 148 in the illustrated circuit, see FIG. 2. Upon actuation of the takeup reel drive means, the reel of the takeup cartridge is rotated in a clockwise direction and the automatic strip threading mechanism 140 threads, i.e. snubs, the leading end portion of the feeding strip to the hub of such rotating reel. When a sufficient amount of strip material, i.e. several strip curls, has built up on the rotating reel hub, the hub diameter sensing mechanism 141 will neutralize the strip threader, and the strip of web material 20 will be wound onto the takeup cartridge reel in the manner shown by FIG. 6A.

As the strip of web material 20 is wound onto the reel of the takeup cartridge 10T and is correspondingly drawn off the reel of the supply cartridge 10S, a strip supply indicating mechanism 149, located in the schematically illustrated circuit, will determine the amount of strip material remaining on the hub of the supply cartridge reel. It would appear that when the trailing end portion 26 of the strip material departs the supply cartridge reel hub and is thereafter fed past the double pole switch 111, so that the switching element 112 is automatically returned to its normal lower position space from the switch pole 114 and in contact with the switch pole 113, the above-described connections in the schematically illustrated circuit between the power source 103 and the solenoids 115 and 122 will be sequentially restored; however, when the supply cartridge reel is devoid of strip material the strip supply indicating mechanism 149 is constructed to further interrupt that portion of the illustrated circuit which extends between the power source 103 and the closed switch 110, so that restoration of the connection between the power source and the solenoids 115 and 122 is consequently prevented.

Figure 6B:
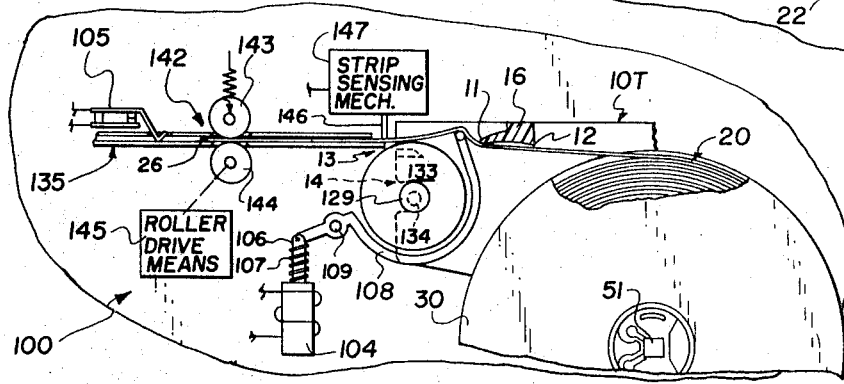
Figure 6C:
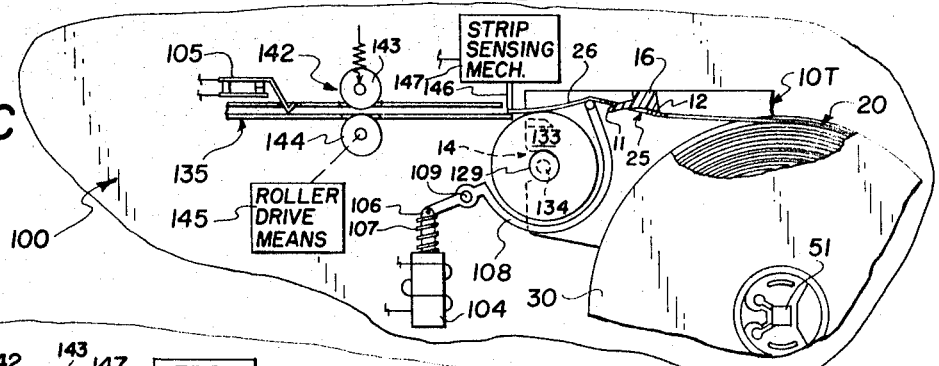
Figure 6D:
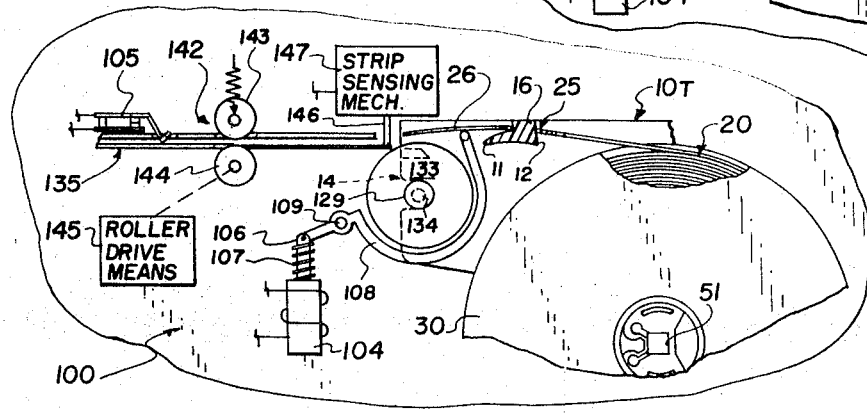

With reference to FIG. 6B, it can be seen that when the trailing end portion 26 of the strip of web material 20 winding onto the reel of the takeup cartridge 10T is fed past the open switch 105, such switch will automatically return to its normally closed position, thereupon restoring the above-described connection in the schematically illustrated circuit between the power source 103 and the solenoid 104. Consequently upon resulting actuation of the solenoid 104, the curved strip guiding member 108 will pivot to its active position partially within the takeup cartridge interior. Thereafter, as the trailing end portion of the winding strip departs the strip guideway 135, the curved member 108 will guide an edge of the aperture 25 in such strip end portion sequentially into engagement with the takeup cartridge's finger 11 and barb 12, see FIGS. 6C and 6D. Moreover, although the depressed probe 146 of the strip sensing mechanism 147 is released upon the departure of the trailing end portion of the winding strip from the strip guideway, so as to deactuate the takeup drive reel means 148 as described above, the inertia of the rotating takeup cartridge reel will be sufficient to move such strip end portion from its position shown in FIG. 6C to that in FIG. 6D. Finally, the takeup cartridge 10T supporting the newly reeled strip of web material 20 in its interior can be removed from the strip transport apparatus 100, and the (now empty) supply cartridge 10S can be inserted in the area of such apparatus constructed for the receipt of an empty takeup cartridge.

Although the strip transport apparatus embodiment is described for feeding of a strip of web material in a single predetermined direction which extends from a supply cartridge to a takeup cartridge, it will be appreciated that apparatus can be devised wherein the strip material can alternatively be fed back and forth between the two separated cartridges. Furthermore, although the station 101 in the strip transport apparatus embodiment is intended to be used for recording, i.e. writing, information on the strip of web material and for playback, i.e. reading of such recorded information, it should be understood that such station can be used for other purposes such as, for example, scanning the strip material for manufacturing defects.

The present invention has been described in detail with particular reference to a preferred embodiment thereof, but it will be understood that variations and modifications can be effected within the spirit and scope of the invention.

I claim:

1. For use with a strip retaining member that comprises a finger and barb which are both extendable through an aperture, having at least one edge, in a leading end portion of a strip of web material to respectively engage an aperture edge and retain the leading end portion on the finger and barb, apparatus for releasing the leading end portion from engagement with the strip retaining member, said apparatus comprising:
   means for disengaging the leading end portion from the barb; and
   means for advancing the leading end portion off the finger when such end portion is disengaged from the barb.

2. For use with a cartridge of the type having an interior for storing a strip of web material and having a strip retaining member that comprises a finger and barb which are both extendable through an aperture, having at least one edge, in a leading end portion of such stored strip so as to respectively engage an aperture edge and retain the leading end portion on the finger and barb, apparatus for releasing the leadend portion of the stored strip from engagement with the strip retaining member, said apparatus comprising:
   means for disengaging the leading end portion from the cartridge barb; and
   means for feeding the stored strip in a predetermined direction when disengaged from the cartridge barb, and in response to such strip feeding, for advancing the leading end portion off the cartridge finger.

3. For use with a cartridge of the type having an interior for storing a strip of web material and having a strip retaining finger which is extendable through an aperture, having at least one edge, in a leading end portion of such a stored strip to engage an aperture edge and retain the leading end portion on the finger, apparatus for releasing the leading end portion of the stored strip from engagement with the strip retaining finger, said apparatus comprising:
   first means actuatable for feeding the stored strip in a predetermined direction, and in response to such strip feeding, for advancing the leading end portion off the strip retaining finger; and
   second means for actuating said first means for such feeding and advancing.

4. Apparatus as recited in claim 3, wherein said first means includes a plurality of strip feeding members, said members being positionable in the cartridge interior to make intimate frictional contact with the stored strip of web material, and means for positioning said members to make such contact with the stored strip.

5. Apparatus as recited in claim 3, wherein said apparatus further comprises means defining a cartridge receiving space, and said second means includes means for actuating said first means in response to receipt of the cartridge in said space.

6. For use with a cartridge of the type having an interior for storing a strip of web material on a reel supported by the cartridge for rotation in its interior and further having a strip egress opening through which such a stored strip is movable and a strip retaining finer which is extendable through an aperture, having at least one edge, in a leading end portion of the stored strip so as to engage an aperture edge and retain the leading end portion on the finger, the strip retaining finger being located in the cartridge interior and having a free end portion extending towards, and spaced from, the strip egress opening, apparatus for releasing the leading end portion of the stored strip from engagement with the strip retaining finger, said apparatus comprising:
   first means actuatable for pulling the stored strip off the rotatably supported reel, and in response to such strip pulling, for advancing the leading end portion of the stored strip off the free end portion of the strip retaining finger; and
   second means for actuating said first means for such pulling and advancing.

7. Apparatus as recited in claim 6, wherein the strip of web material further has a pair of opposite faces and said first means includes a cooperating pair of strip feeding members actuatable therewith to make intimate frictional contact respectively with the opposite faces of the leading end portion of the stored strip at a location in the cartridge interior between the strip egress opening and the strip retaining finger.

8. Apparatus as recited in claim 7, wherein said strip feeding members includes means for pulling the stored strip off the rotatably supported reel and advancing the leading end portion of such a pulled strip through the strip egress opening.

9. Apparatus as recited in claim 8, wherein said apparatus further comprises means defining a cartridge receiving space, and said second means includes means for actuating said first means in response to receipt of the cartridge in said space.

10. For use with a cartridge of the type having an interior for storing a strip of web material and having a strip retaining member that comprises a finger and barb which are jointly extendable through an aperture, having at least one edge, in a leading end portion of such a stored strip so as to respectively engage an aperture edge and retain the leading end portion on the finger and barb, apparatus for releasing the leading end portion of the stored strip from engagement with the strip retaining member, said apparatus comprising:
   first means actuatable for disengaging the leading end portion from the cartridge barb;
   second means for actuating said first means for such disengaging;
   third means actuatable for feeding the leading end portion out of the cartridge interior when disengaged from the cartridge barb by said first means, and in response to such feeding, for advancing the leading end portion off the cartridge finger; and
   fourth means for actuating said third means for such feeding and advancing.

11. Apparatus as recited in claim 10, wherein said first means includes a strip support member, said member being positionable in the cartridge interior to support the leading end portion of the stored strip for movement past the cartridge barb when disengaged therefrom by said first means, and means for positioning said member for such support of the leading end portion.

12. Apparatus as recited in claim 11, wherein said strip support member is movable between a first position spaced from the cartridge and a second position for such support of the leading end portion, and said apparatus further comprises means for moving said strip support member between its first and second positions.

13. Apparatus as recited in claim 11, wherein the strip of web material further has a pair of opposite faces and said third means includes a cooperating pair of strip feeding members, said strip feeding members being positionable in the cartridge interior to make intimate frictional contact respectively with the opposite faces of the leading end portion of the stored strip, and means for positioning said strip feeding members for such contact with the leading end portion.

14. Apparatus as recited in claim 13, wherein at least one of said strip feeding members is movable between a first position spaced from the cartridge and a second position for such contact of said strip feeding members with the leading end portion of the stored strip, and said apparatus further comprises means for moving at least one of said strip feeding members between said first and second positions.

15. Apparatus as recited in claim 13, wherein said apparatus further comprises means defining a cartridge receiving space, and said second means includes means responsive to receipt of the cartridge in said space to actuate said first means for such disengaging of the leading end portion form the cartridge barb.

16. Apparatus as recited in claim 15, wherein one of said strip feeding members includes an idler roller and the other of said strip feeding members includes a drive roller, one of said rollers having a support movable with respect to said cartridge receiving space and the other of said rollers having a support fixed with respect to said space, said fixed support having means for cooperation with an edge portion of the cartridge, when received in said space, to orient such a received cartridge with respect to said first and third means.

17. For use with a cartridge of the type having an interior for storing a strip of web material and a strip ingress opening through which such a strip is movable, and further having a strip retaining member that comprises a finger and barb for respectively engaging at least one edge of an aperture in a trailing end portion of a strip which is feeding into the cartridge interior through the strip ingress opening, the finger and barb being jointly extendable through the aperture to engage an aperture edge and retain the trailing end portion, apparatus comprising:

means for feeding the strip of web material into the cartridge interior through the strip ingress opening; and means for guiding the trailing end portion of such a feeding strip sequentially into engagement with the cartridge finger and barb.

18. Apparatus as recited in claim 17, wherein the cartridge is further of the type whose strip retaining member is located in the cartridge interior and a free end portion of the finger extends towards, and is spaced from, the strip ingress opening, and said guiding means includes:

a strip guiding member;
said member being positionable in the cartridge interior between the strip ingress opening and the free end portion of the finger to support the trailing end portion of the feeding strip; and means for positioning said member for such support of the trailing end portion of the feeding strip.

19. Apparatus as recited in claim 18, wherein said strip guiding member is movable between first position spaced from the cartridge and a second position for such support of the trailing end portion of the feeding strip, and said apparatus further comprises means for moving said member between its first and second positions.

20. For use with a strip of web material having an aperture in both of its ends, and supply and takeup cartridges of the type constructed to respectively discharge and receive such a strip through a strip egress-ingress opening, each cartridge having a strip retaining member that comprises a finger and barb which are jointly extendable through either one of the apertures, having at least one edge, in a leading or trailing end portion of the strip so as to respectively engage an aperture edge and retain an end portion, and each strip retaining member being located within a respective cartridge, apparatus for releasing such a strip of web material having its leading end portion engaged by a supply cartridge finger and barb and for guiding the trailing end portion of such a released strip into engagement with a takeup cartridge finger and barb, said apparatus comprising:

means for disengaging the leading end portion of the strip from the supply cartridge barb;

means for feeding the leading end portion out of the supply cartridge when disengaged from the supply cartridge barb, and in response to such feeding, for advancing the leading end portion off the supply cartridge finger;

means for feeding the strip, whose leading end portion is advanced off the supply cartridge finger, into the takeup cartridge; and means for guiding the trailing end portion of such a feeding strip sequentially into engagement with the takeup cartridge finger and barb.